(12) United States Patent
Creekmore et al.

(10) Patent No.: US 9,974,250 B1
(45) Date of Patent: May 22, 2018

(54) INSULATED CHILLING RESERVOIR FOR LIQUID SOLUTIONS UTILIZED IN HYDROPONIC GROWING SYSTEMS

(71) Applicants: Donnie Lee Creekmore, Modesto, CA (US); Bryan Scott Basinger, Fresno, CA (US)

(72) Inventors: Donnie Lee Creekmore, Modesto, CA (US); Bryan Scott Basinger, Fresno, CA (US)

( * ) Notice: Subject to any disclaimer, the term of this patent is extended or adjusted under 35 U.S.C. 154(b) by 223 days.

(21) Appl. No.: 15/197,678

(22) Filed: Jun. 29, 2016

(51) Int. Cl.
*A01G 31/02* (2006.01)
*A01G 9/24* (2006.01)
*A01G 7/04* (2006.01)

(52) U.S. Cl.
CPC ............ *A01G 31/02* (2013.01); *A01G 7/045* (2013.01)

(58) Field of Classification Search
CPC .......... A01G 31/02; A01G 9/246; A01G 9/02; A01G 9/028; A01G 9/1073; A01G 9/24; A01G 9/26
See application file for complete search history.

(56) References Cited

U.S. PATENT DOCUMENTS

| 5,010,686 A * | 4/1991 | Rivest | A01G 31/02 47/62 C |
| 2009/0126269 A1 * | 5/2009 | Wilson | A01G 31/00 47/62 R |

OTHER PUBLICATIONS

"Basic Hydorponic Systems and How They Work", Jun. 24, 2016, U.S., Internet.

* cited by examiner

*Primary Examiner* — Monica L Williams
(74) *Attorney, Agent, or Firm* — Richard A. Ryan (57) ABSTRACT

An insulated chilling reservoir for chilling and storing a nutrient solution utilized with a hydroponic system for growing plants. The chilling reservoir has a plurality of exterior walls that enclose an interior chamber that is sized and configured to receive a quantity of the nutrient solution. At least the side exterior walls are insulated. The interior chamber has one or more interior walls and a chamber floor that are in contact with the nutrient solution when it is in the interior chamber. The chilling reservoir has a chilling mechanism associated with the reservoir body and the interior chamber that lowers the temperature of the nutrient solution through the interior walls when the solution is in the interior chamber. A control panel allows the grower to monitor and control the temperature of the nutrient solution. The chilling mechanism includes evaporator coils in the exterior walls, a radiator and a refrigerant system.

20 Claims, 8 Drawing Sheets

FIG. 15

INSULATED CHILLING RESERVOIR FOR LIQUID SOLUTIONS UTILIZED IN HYDROPONIC GROWING SYSTEMS

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses that are utilized in hydroponic and like gardening systems. In particular, the present invention relates to such apparatuses and gardening systems that have a reservoir which contains a liquid solution that provides nutrients which are beneficial for the growth and health of plants in such gardening systems. Even more particularly, the present invention relates to such apparatuses and systems that are configured to cool the liquid solution to improve production of a crop from the plants.

B. Background

The utilization of hydroponic, aquaponic and like gardening systems to grow plants, in particular plants that are grown to produce a commercial crop, are generally well known. Plants grown in hydroponic, aquaponic and like gardening systems (hereinafter collectively referred to as "hydroponic systems") are cultivated in the absence of soil, with the roots of the plants being located in an aqueous medium containing the nutrients necessary and beneficial for the plants to grow and to produce a crop. As well known, hydroponic cultivation of plants has several advantages over growing such plants in soil, including reducing the likelihood of the plants being affected by soil-borne diseases, minimizing damage to the soil from repetitive cultivation on the same section of land and, typically, shorter cultivation crop cycles. In addition, hydroponic gardening is particularly suited for growing plants in greenhouses or the like, allowing many areas of the world to have fresh grown crops, including vegetables and other food plants, that would not otherwise be available in the area or at the time of year. Because the plants in a hydroponic system are grown without soil, the nutrients necessary for plant growth must be supplied by the liquid medium of the hydroponic system. In addition, such systems are typically configured to supply oxygen to the plant roots to promote plant growth and prevent the roots from rotting.

Hydroponic systems are configured in many different forms, ranging from those that are of a simple configuration and are manually operated to those that are of a very complex configuration and which utilize sophisticated automation. A simple hydroponic system generally has the advantage of being relatively inexpensive to set-up and easy to use, advantages which are typically favored by the homeowner or smaller sized grower. One of the main disadvantages of simple hydroponic systems is that they generally require more time and careful attention by the grower to operate. In contrast, complex hydroponic systems are usually configured to essentially operate generally independent of significant input by the grower. The primary disadvantage of such systems is the initial set-up cost, the electricity cost to operate the system and the complexity of the system for the homeowner or other small grower. The simplest hydroponic systems utilize a growing area in a pot, tray or like plant container that defines a growing area in which the plants sit, a reservoir that receives and contains nutrient solution and a device to deliver the nutrient solution to the plant container. The fluid reservoir is typically positioned below or next to the plant tray/container to capture solution that flows through the growing area. Complex hydroponic systems utilize electric pumps in a fluid in the reservoir to pump the nutrient solution to the plants on a regular timed basis, with the nutrient level of the water being regularly or even continuously monitored by the hydroponic system. The more complex hydroponic systems also include one or more mechanisms for injecting oxygen into the system and a mechanism to keep the nutrient solution flowing past the plants.

In a typical hydroponic system the reservoir for storing the nutrient solution is formed of plastic injection molded tubs and trays that hold the liquid nutrient solution, typically comprising a variety of nutrients that are suspended in water. As well known to persons who are familiar with such hydroponic systems, these reservoirs typically have little to no insulation against ambient temperature changes and do not come equipt with a mechanism to control the temperature of the nutrient solution in the reservoir. As a result, the ambient temperature of the growing area affects the temperature of the nutrient solution in the reservoir. For current hydroponic systems, there is no way to easily adjust the temperature of the nutrient solution in the reservoir if the temperature of the solution is not at or at least near that which is desired by the grower and is considered to be beneficial for the plants and crop growth. Generally, the temperature of the nutrient solution is warmer than what is considered to be optimal for plant growth and crop production due to the warmth of the growing area from the light source, including the sun, that is being utilized for the plants. For indoor growing operations, the temperature of the electric lights that are utilized for plant growth generate temperatures which will negatively affect (i.e., increase) the temperature of the nutrient solution.

Controlling the temperature of the nutrient solution by chilling or refrigerating the solution while it is in the reservoir is done to address a handful of common problems that are known to occur when the temperature of the solution is not within a specific range of temperatures. As will be readily understood by those skilled in the art, the desired range of temperatures is dependent on the specific species of plants being cultivated in the hydroponic system. When the temperature of the nutrient solution gets too high, the overall growth of the plants will slow down and bioactive contaminants, such as bacteria, molds, algae and the like, can proliferate, which can also negatively impact overall plant health and growth. Of course, the problems that occur from the nutrient solution being too warm will negatively impact the production of crop from the plants. If the temperature of the nutrient solution gets too low, plant growth will be stunted and root growth substantially slowed or, in worse case scenarios, there can be a complete failure of the crop. For some high dollar crops, such as *cannabis* and the like, the problems from the nutrient solution being too warm or too cold can be a significant loss of investment, and/or potential income, for the grower.

The temperature of the nutrient solution in a reservoir is one of the most important factors affecting the dissolved oxygen content of the solution. In fact, the ability of a nutrient solution, which is primarily comprised of water, to hold oxygen is directly related to the temperature of the nutrient solution (water). As the temperature of the nutrient solution increases, the dissolved oxygen potential decreases. As the temperature of the nutrient solution gets colder, the dissolved oxygen potential increases. Because oxygen is good for the roots of the plants, a grower will typically try to have as cold of a solution as possible. However, if the temperature of the nutrient solution gets too cold, the plant growth will slow and, eventually, stop altogether due to slowed nutrient uptake.

The reservoirs of most indoor horticulturists tend to have nutrient solutions that are too warm. As set forth above, reservoirs with higher temperature nutrient solutions tend to have a decrease in dissolved oxygen content, which can allow anaerobic pathogens to thrive. *Pythium*, also known as root rot, is the most common pathogen that affects indoor growers who have reservoirs with nutrient solutions that are too warm. For one variety of plants, the optimal temperature for the nutrient solution is 63° F. to 72° F. Within this temperature range, the dissolved oxygen content is high and the temperature is warm enough to facilitate nutrient uptake by the plants.

As well known in the art, it is often necessary for a grower to employ one or more devices to keep the nutrient solution in the reservoir in or at least very near the desired temperature range. Some of the techniques utilized to control the temperature of the nutrient solutions are somewhat primitive and, while they can work, generally are only utilized until the monotony of the technique becomes overbearing or the grower gets busy with other issues. A somewhat primitive, but widely utilized, current technique that is utilized to chill the nutrient solution comprises freezing water in a plastic container and then placing the container of frozen water into the reservoir having the nutrient solution to chill the solution. Once the water in the container thaws, the grower will remove the container from the reservoir and replace it with a new container of frozen water. Although this method of chilling the nutrient solution works, it is both physically and energy inefficient. A current technique of warming the liquid nutrient solution in a reservoir, mostly utilized in colder climate areas, comprises placing an electric drop-in water heater or heaters, such as a submersible titanium heater (some of which have a thermostat to keep the liquid at or near the desired temperature), in the reservoir. This method of controlling the temperature of the nutrient solution is known to be at least somewhat energy inefficient and typically does not evenly heat the nutrient solution in the reservoir.

For growers who have a reservoir with nutrient solution temperatures that are rising above the desired range, often a water chiller apparatus is the best option for an automated device to remedy the high temperature problem. A water chiller is configured generally like an air conditioner unit but is made for cooling liquid instead of air. Liquid nutrient solution from the reservoir is circulated through the water chiller, which lowers the temperature of the nutrient solution. A dedicated pump, circulating the nutrient solution between the reservoir and the chiller, is usually required for a water chiller to operate most efficiently. Unfortunately, much like an air conditioner, the typical water chiller will create heat as waste, which will only add to the ambient heat in the growing area that creates a counterproductive process. Some growers remedy this issue by placing the chiller in a separate room so the heat generated by the chiller will not be readily absorbed by the nutrient solution in the reservoir.

The garden area of a typical hydroponic system has a lighting system comprising a plurality of high-intensity discharge lamps, which create a significant amount of radiant heat. To address the heat that is generated in the garden area of a hydroponic system, some growers will place the reservoir having the nutrient solution in a room, commonly referred to as a control room, that is separate from the garden area to reduce the likelihood that the ambient heat in the garden room will be absorbed by the nutrient solution in the reservoir. The use of a separate room allows for heightened control over all of the reservoir parameters. In such systems, submersible or inline pumps deliver the nutrient solution to the garden room or rooms as needed by the plants therein.

As well known in the art, it is very important for the grower to closely monitor the various attributes of the nutrient solution in the reservoir, including the dissolved oxygen content, pH and the nutrient concentration. Growers typically aerate the nutrient solution, often using an air pump and air stone or other air diffuser in the solution, to keep the solution absorbing oxygen. As set forth above, the temperature of the nutrient solution is a major factor to how much oxygen the water portion thereof can retain. As long as the temperature of the nutrient solution is kept in the desired range, the air pump and diffuser will be sufficient to replace the dissolved oxygen used by the plants. With regard to the pH, which is a crucial factor due to determining the solubility of the nutrients, it is also important for the grower to carefully monitor the pH level of the nutrient solution. Likewise, it is also necessary for the grower to carefully monitor the nutrient concentration of the nutrient solution to deliver an optimal concentration to the plants. Although these two factors are not heavily affected by the temperature of the nutrient solution, they do require appropriate monitors and careful review by the grower. With the use of the air pump, diffuser and pH and nutrient monitors, many growers can become somewhat overwhelmed by all of the monitors and equipment being utilized in the growing room. Unfortunately, use of a separate chiller to lower the temperature of the nutrient solution in a hydroponic system adds to the number and complexity of the equipment used by the grower.

The current apparatuses, systems or other techniques to chill or warm the liquid nutrient solution in the reservoir (collectively referred to as temperature control techniques) have well known problems. For instance, some of the existing temperature control solutions for hydroponic systems are inefficient, utilize too much of valuable space in the hydroponic system (which can be better utilized for plants) and/or comprise a number of moving parts and multiple hoses and pumps to constantly exchange the nutrient solution through a chiller apparatus and back to the reservoir. Although the current temperature control solutions generally work, at least to some extent, they come at significant monetary, space and efficiency costs, which typically results in a less than desired experience by the grower. With regard to water chillers specifically, the cost, space and complexity of the chillers and the equipment necessary to use and operate the chillers, generally results in lower overall use of this temperature control solution.

Despite the various prior art temperature control solutions, what is needed is an improved apparatus and system for chilling the nutrient solution in a reservoir utilized in a hydroponic system. An improved apparatus and system should be configured to effectively and efficiently lower the temperature of a nutrient solution that will be delivered to plants in a hydroponic system to help the plants thrive and produce more and better quality crop. Preferably, the improved apparatus and system will reduce the number of individual pieces of equipment in a hydroponic system and reduce the complexity of the equipment in the system so as to allow the grower to better focus on other issues he or she may have with regard to growing the plants. An improved apparatus for lowering the temperature should be configured so as to be easy and cost effective to use.

SUMMARY OF THE INVENTION

The insulated chilling reservoir and system of the present invention provides the benefits and solves the problems identified above. That is to say, the insulated chilling reservoir and system of the present invention is structured and arranged to be beneficially utilized in a hydroponic system to lower the temperature of the liquid nutrient solution which is delivered to the plants in the system to facilitate healthy plant growth and improve the quality and quantity of the crop produced by the plants. The insulated chilling reservoir of the present invention comprises a combination of a reservoir and chilling unit in one component, which reduces the number of individual pieces of equipment in a hydroponic system and, by eliminating extra wires, pipes and controllers that must be monitored, reduces the complexity of the equipment in the system to allow the grower to better focus on other concerns and/or issues he or she may have with regard to growing the plants in the hydroponic system. In a preferred embodiment of the present invention, the new insulated chilling reservoir and system for lowering the temperature of a liquid nutrient solution utilized in a hydroponic system is configured to be easy and cost effective to use.

The new insulated chilling reservoir of the present invention allows a grower to more effectively and efficiently lower and maintain the lower temperature of a nutrient solution that is utilized to grow plants and produce a crop in a typical hydroponic system. The new insulated chilling reservoir controls the temperature of the nutrient solution and protects, using insulated walls, the reservoir from the fluctuations that occur in the ambient temperature in the growing room. In addition, the new insulated chilling reservoir provides a digital readout displaying the pH, TdC, O2, temperature and volume (by weight). With these improvements, the new insulated chilling reservoir allows the grower to have immediate information with regard to the conditions in the reservoir without having to disturb the reservoir's internal environment, while addressing the various issues with regard to existing or currently available products attempting to accomplish, but unable to, the same goals of the present invention. In addition, the insulated chilling reservoir of the present invention will reduce the amount of labor, time and cost needed to maintain a hydroponic system in a manner that facilitates healthy plant growth and higher quality and quantity production of the desired crop.

In one embodiment of the present invention, the insulated chilling reservoir generally comprises a reservoir body, an interior chamber in the reservoir body and chilling mechanism associated with the reservoir body and the interior chamber for lowering the temperature of the nutrient solution when the nutrient solution is inside the interior chamber of the chilling reservoir. The reservoir body has a plurality of exterior walls that define a lower end and an upper end of the reservoir body. The plurality of exterior walls include one or more side exterior walls (i.e., the exterior walls that extend between the lower end and the upper end of the reservoir body), each of which are insulated with an insulating material. The interior chamber is enclosed by the exterior walls of the reservoir body and is defined by one or more interior walls and a chamber floor. The interior chamber is sized and configured to receive and hold the nutrient solution therein, with the nutrient solution being disposed against the interior walls of the interior chamber. The chilling mechanism comprises a wall chilling system, a condenser system and a refrigerant system that are each cooperatively structured and arranged to lower the temperature of the nutrient solution through the interior walls of the interior chamber when the nutrient solution is in the interior chamber. The wall chilling system includes one or more evaporator coils that are disposed inside at least one, but preferably all, of the side exterior walls. The condenser system comprises a radiator, typically attached to one of the side exterior walls.

In one embodiment, the chilling reservoir also has a reservoir lid that is sized and configured to be received at the upper end of the reservoir body and to close the interior chamber. The reservoir lid can have one, though typically a plurality of openings that are each sized and configured to receive one or more wires, tubes, cables, pipes, hoses or other items. Preferably, the openings have a rubber grommet disposed therein that is configured to sealably close the openings around the one or more items. The reservoir lid can have one or more reservoir doors for allowing the grower to easily access the interior chamber and the nutrient solution in the interior chamber. The reservoir lid can be hingedly or removably attached to the reservoir body.

The chilling reservoir can also have one or more wheels at the lower end of the reservoir body. In one embodiment, the wheels are attached to or integrally formed with a platform member that is structured and arranged to receive the lower end of the reservoir body and to moveably support the reservoir body. The reservoir body can sit on top of the platform member or the platform member can attach to the reservoir body, typically at or near the bottom wall thereof.

The preferred configuration of the chilling reservoir also includes a control device that is attached to one of the exterior walls of the reservoir body, with the control device being configured to control the temperature of the nutrient solution when the nutrient solution is in the interior chamber. The control device can have a display screen, one or more buttons and a USB port.

In one embodiment, a vent shroud is utilized with the chilling reservoir. The vent shroud has a shroud housing, one or more intake openings in the shroud housing and a discharge vent integral with or attached to the shroud housing. The shroud housing is sized and configured to enclose the radiator. The discharge vent is sized and configured to be attached to a vent hose that allows the grower to discharge the heat from the radiator away from the growing area.

In another embodiment, the chilling reservoir comprises a reservoir lid, sized and configured to be received at the upper end of the reservoir body, that has one or more plant openings through the body of the reservoir lid. Each of the plant openings has at least one plant therein, often supported by a basket that is placed in the openings in the reservoir lid.

In another embodiment, the chilling reservoir is sized and configured to receive a floating plant tray that is configured to float on the nutrient system in the interior chamber. The floating plant tray can have the openings and baskets described above.

In another embodiment of the present invention, a hydroponic system that generally comprises one or more plants, a plant tray supporting each of the plants, a liquid nutrient solution and a chilling reservoir for chilling and storing the chilled nutrient solution. The chilling reservoir is structured and arranged as set forth above.

Accordingly, the primary object of the present invention is to provide a new chilling apparatus and system that has the advantages set forth above and which overcomes the various disadvantages and limitations that are associated with presently available apparatuses, systems and techniques for reducing the temperature of a liquid nutrient solution utilized in a hydroponic system.

It is an important object of the present invention to provide a new apparatus and system for reducing the temperature of a nutrient solution utilized in a hydroponic system that comprises an insulated chilling reservoir that contains, chills and maintains the temperature of the nutrient solution in a pre-determined beneficial temperature range.

An important aspect of the present invention is that it provides a new insulated chilling reservoir and system that accomplishes the objectives set forth above and elsewhere in the present disclosure.

Another important aspect of the present invention is that it provides a new insulated chilling reservoir and system that is structured and arranged to be utilized in a hydroponic system to lower the temperature of a liquid nutrient solution which is delivered to the plants in the system to facilitate healthy plant growth and improve the quality and quantity of the crop produced by the plants.

Another important aspect of the present invention is that it provides a new insulated chilling reservoir and system that, in addition to other features, is a combination of a reservoir and chilling unit in one complete component to reduce the amount of equipment in a hydroponic system and, by eliminating extra wires, pipes and controllers that must be monitored, reduces the complexity of the equipment in the system.

Another important aspect of the present invention is that it provides a new insulated chilling reservoir and system that controls the temperature of a nutrient solution in a hydroponic system and protects, using insulated walls, the reservoir and the liquid nutrient system therein from the fluctuations that occur in the ambient temperature in the growing room of the hydroponic system.

Another important aspect of the present invention is that it provides a new insulated chilling reservoir and system that has a control device that allows the grower to have immediate information with regard to the conditions in the reservoir without having to disturb the reservoir's internal environment.

Yet another important aspect of the present invention is that it provides a new insulated chilling reservoir that is easy and relatively cost effective to use.

As will be explained in greater detail by reference to the attached figures and the description of the preferred embodiment which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new insulated chilling reservoir and system of the present invention, those skilled in the art will readily appreciate that the present invention is not so limited. In addition, the exemplary embodiments of the present apparatus is shown and described herein with only those components that are required to disclose the present invention. As such, many of the necessary mechanical elements for attaching and using the present invention are not shown or necessarily described below, but which are well known to persons who are skilled in the relevant art. As will be readily appreciated by such persons, the various elements of the present invention that are described below may take on any form consistent with forms that are readily realized by a person of ordinary skill in the art having knowledge of refrigerated containers and the like.

Figure 1:
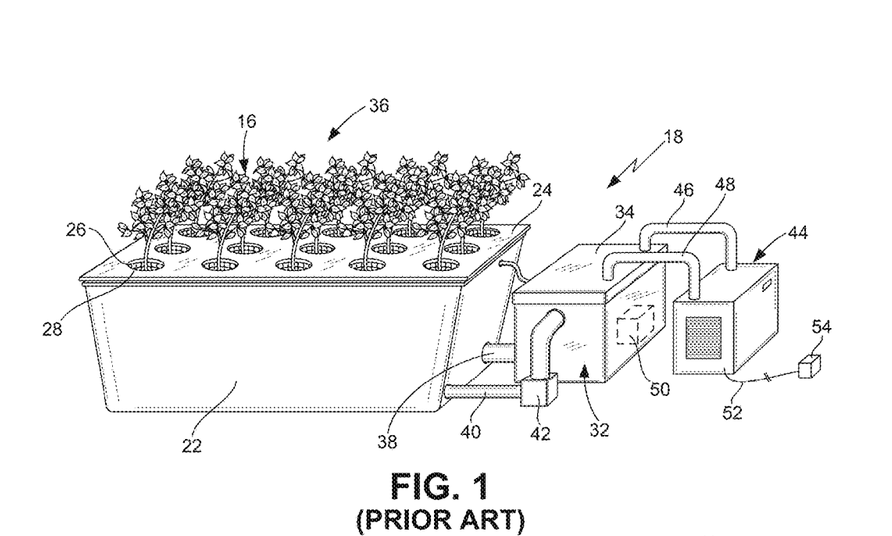
FIG. 1 is a side perspective view of a prior art hydroponic growing system showing use of a chiller to lower the temperature of the liquid nutrient solution in the reservoir prior to delivery to the plant tray having a plurality of plants.

An insulated chilling reservoir that is configured pursuant to one of the preferred embodiments of the present invention is referred to generally as 10 in FIGS. 2-10 and 12-14. The insulated chilling reservoir 10, herein referred to as the "chilling reservoir", is utilized with a hydroponic system 12 that utilizes the new chilling reservoir 10 to reduce the temperature of a liquid nutrient solution 14 (FIG. 15) that will be provided to one or more plants 16, as shown with regard to the prior art hydroponic system 18 in FIG. 1. A typical prior art hydroponic system 18 for growing one or more plants 16 to produce a crop 20, has a plant tray 22 in which the plants 16 will grow. In one embodiment of the prior art hydroponic system 18, plant tray 22 has a tray lid 24 with a plurality of plant openings 26 through which is grown one or more plants 16. In a common configuration of the prior art system 18, there is a basket 28 removably received in each of the openings 26 to support one plant 16 through the openings 26, as shown in FIG. 1. Roots from the plants 16 extend generally downward into a growing medium 30 inside the plant tray 22 into which a liquid nutrient solution 14 is received to facilitate healthy growth of the plants 16 and to, ideally, produce an increase in the quality and quantity of the crop 20 produced by the plants 16. Though not shown, an indoor prior art hydroponic system 18 will also have one or more lights, fans, sources of water, controllers and other apparatuses and systems that are utilized to optimize growth of the plants 16 and production of the crop 20.

Many growers utilize a separate prior art reservoir 32, commonly referred to as a head bucket, to receive, mix and treat the liquid nutrient solution 14 (typically comprising a variety of plant nutrients that are suspended in water) prior to the nutrient solution 14 being delivered to the plant tray 22 and the plants 16. In a typical prior art hydroponic system 18 the reservoir 32 for storing the liquid nutrient solution 14 has a lid 34, as shown in FIG. 1, that encloses the interior chamber (not shown) of the prior art reservoir 32, with both the reservoir 32 being a plastic injection molded tub-like structure that holds the liquid nutrient solution 14. As well known to persons who are familiar with prior art hydroponic systems 18, these reservoirs 32 typically have little to no insulation against ambient temperature changes and do not come equipt with a mechanism to control the temperature of the nutrient solution 14 in the reservoir 32. As a result, the ambient temperature of the growing area 36, which is where the plant tray 22 and (typically) the prior art reservoir 32 are located, can fluctuate somewhat depending on various factors. This fluctuation is known to affect the temperature of the nutrient solution 14 in the reservoir 32. Generally, the temperature of the nutrient solution 14 tends to be higher than desired (as set forth in the Background) due to the lights and other equipment that are utilized to facilitate growth of the plants 16 in the growing area 36. As also set forth in the Background, the nutrient solution 14 being at a relatively high temperature is generally not considered to be beneficial for the healthy growth of the plants 16 and the production of high quality and quantity of crop 20.

In the prior art hydroponic system 18 of FIG. 1, liquid nutrient solution 14 from the reservoir 32 is drawn into the plant tray 22 through a discharge pipe 38 that circulates through the growing medium 30, to be drawn up by the plants 16, and then back to the reservoir 32 through an inlet pipe 40 utilizing a circulating pump 42. Some prior art hydroponic systems 18 position the circulating pump 42 inside the reservoir 32 to pump the nutrient solution 14 into plant tray 22 in a manner that circulates the "used" nutrient solution 14 back to the reservoir 32. In other prior art hydroponic systems 18, the plant tray 22 is positioned above the reservoir 32, the circulating pump 42 pumps the nutrient solution 14 into the plant tray 22 and the "used" nutrient solution 14 flows back to the reservoir 32.

In any prior art hydroponic system 18, the grower may determine that the plants 16 and crop 20 may benefit from lowering the temperature of the nutrient solution 14. As set forth in the Background, there are a variety of apparatuses, systems and techniques for reducing the temperature of the liquid nutrient solution 14 in prior art hydroponic systems 18. One common way to lower the temperature of the nutrient solution 14 is to utilize a separate chiller 44, such as shown in FIG. 1, or like apparatus to chill the nutrient solution 14. As shown in FIG. 1, using a chiller 44 requires inlet 46 and outlet 48 lines (tubes, hoses or the like) that connect the chiller 44 to the interior of the reservoir 32, an additional circulating pump 50 in the reservoir to circulate the nutrient solution 14 between the reservoir 32 and chiller 44 and a power cord 52 that connects the chiller 44 to a source of electrical power 54 (such as an outlet, power strip or the like). Though not shown, the chiller circulating pump 50 also must be electrically connected to the source of electrical power 54. As will be readily appreciated by those skilled in the art, although the use of a separate chiller 44 to lower the temperature of the nutrient solution 14 will generally provide the plant benefit results sought by the grower, using a chiller 44 in the hydroponic system 18 adds to the number and complexity of the equipment that is used by the grower to produce the desired crop 20 from the plants 16.

Figure 2:
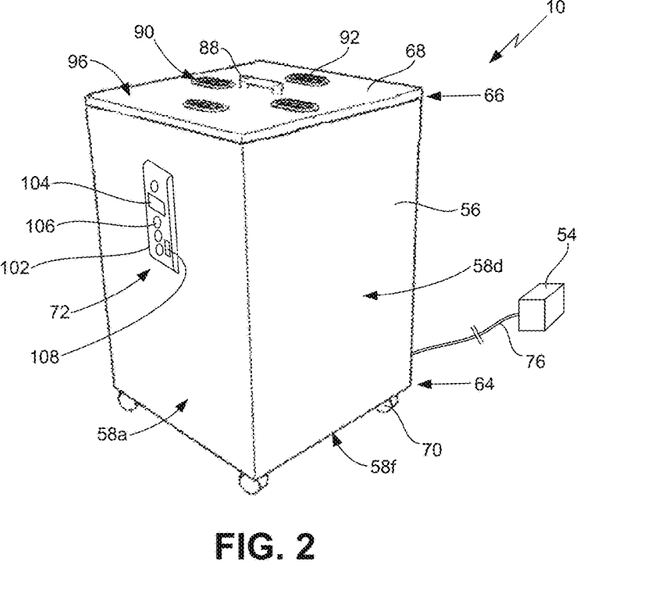
FIG. 2 is a front perspective view of an insulated chilling reservoir that is configured according to a first embodiment of the present invention shown with a lid at the upper end and a control device on the front wall thereof.
Figure 3:
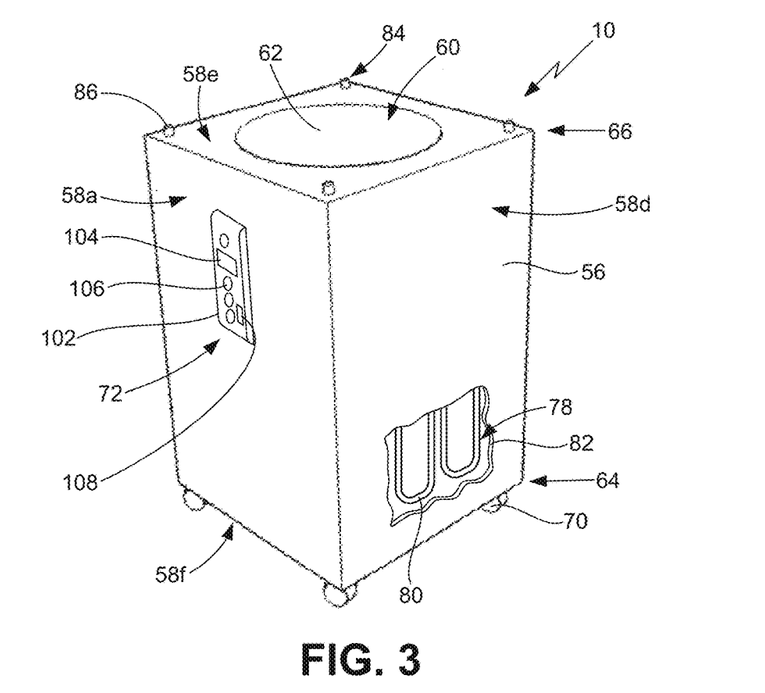
FIG. 3 is a front perspective view of the insulated chilling reservoir of FIG. 2 shown without the lid and the power cord.
Figure 4:
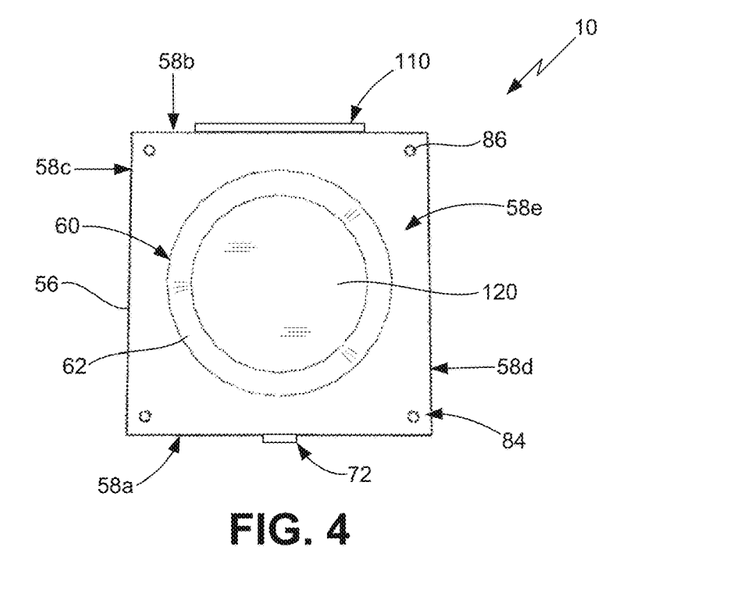
FIG. 4 is a top view of the insulated chilling reservoir of FIG. 3.

The chilling reservoir 10 of the present invention solves the problems created by the use of a separate chiller 44 to lower the temperature of the liquid nutrient solution 14. As set forth in more detail below, the chilling reservoir 10 is structured and arranged to reduce the temperature of the nutrient solution 14, as required or needed, and to maintain the temperature of the nutrient solution 14 in a range desired and set by the user. A first embodiment of the new chilling reservoir 10 is shown in FIGS. 2-5. In this embodiment, the chilling reservoir 10 has a reservoir body 56 with one or more exterior walls 58, such as front wall 58a, back wall 58b, first or left sidewall 58c, second or right sidewall 58d, top wall 58e and bottom wall 58f, which enclose an interior chamber 60 that is defined by one or more interior walls 62, as shown in FIGS. 3 and 4. In the embodiment of the chilling reservoir 10 shown in FIGS. 2-5, the interior chamber 60 is defined by a single interior wall 62 (i.e., having a generally circle, oval or like configuration). In other embodiments, the interior chamber 60 is defined by a plurality of interior walls 62. The reservoir body 56 has a lower end 64 and an upper end 66, with the terms "lower" and "upper" being referenced relative to a floor or other surface on which the chilling reservoir 10 is placed, with the lower end 64 being placed at, on or near that surface. In the embodiment shown in FIGS. 2-5, the chilling reservoir 10 has a reservoir lid 68 at the upper end 66 and one or more, typically a plurality of, wheels 70 at the lower end 64 to allow the grower to easily move the chilling reservoir 10 into or out of the growing area 36. The chilling reservoir 10 of the present invention has a control device 72 that is configured to allow the user to control and monitor conditions of the nutrient solution 14 when the nutrient solution 14 is inside the interior chamber 60. A chilling mechanism 74, best shown in FIGS. 3 and 5 for the first embodiment of the present invention, is configured to chill the interior chamber 60 in a manner that reduces the temperature of the nutrient solution 14 in the interior chamber 60. The control device 72 and chilling mechanism 74 are electrically connected to the source of electrical power 54, preferably by a single power cord 76.

Figure 5:
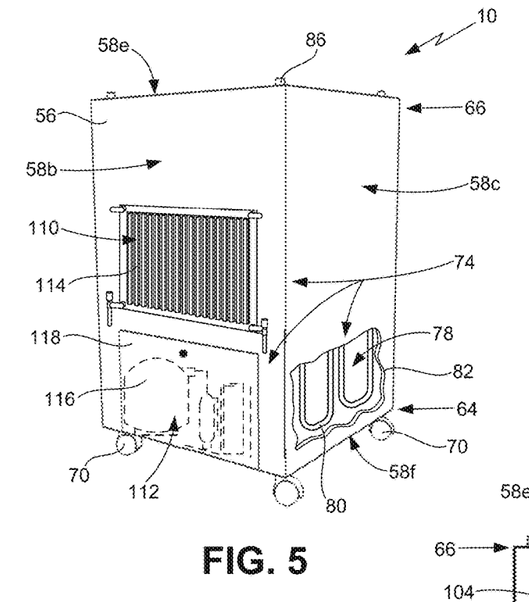
FIG. 5 is a back perspective view of the insulated chilling reservoir of FIG. 3.
Figure 7:
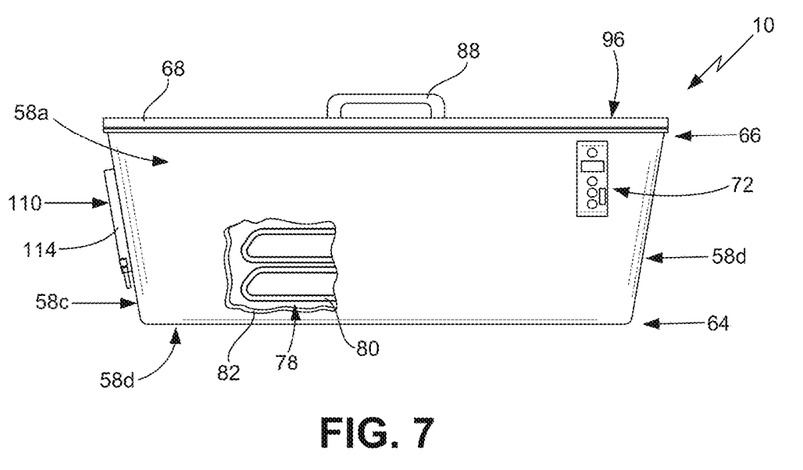
FIG. 7 is a front view of a chilling reservoir that is configured according to a second embodiment of the present invention showing a larger sized reservoir body and the chilling mechanism on a side of the reservoir body.

The exterior walls 58, particularly the side exterior walls 58a, 58b, 58c and 58d, of the reservoir body 56 of chilling reservoir 10 of the present invention are constructed to chill the interior chamber 60, and thereby lower the temperature of the nutrient solution 14 therein, and to generally reduce the impact of the ambient temperature, typically from the growing area 36, on the nutrient solution 14 while the nutrient solution 14 is in the interior chamber 60. To accomplish these two objectives, some or all of the exterior walls 58 of the reservoir body 56 are configured at least generally similar to the exterior walls of a freezer (or refrigerator/freezer combination). More specifically, one or more exterior walls 58 are provided with a wall chilling system 78 that typically has a plurality of evaporator coils 80 disposed inside the subject exterior walls 58, as shown in FIGS. 3, 5 and 7. Typically, the evaporator coils 80 of the wall chilling system 78 will be disposed in the front wall 58a, back wall 58b, first sidewall 58c and/or second sidewall 58d, as opposed to the top wall 58e and bottom wall 58f (although one or more of the latter exterior walls 58 can also have components of the wall chilling system 78). The exterior walls 58 are also provided with insulation (shown as 82 in FIGS. 3, 5 and 7) that, as well known in the art with regard to a typical freezer or refrigerator/freezer combinations, helps direct cold temperature inward toward the interior walls 62 of the interior chamber 60 and, at least generally (preferably substantially) away from the outer surface of the exterior walls 58 so as to reduce heat loss through the exterior walls 58. Even those exterior walls 58 that do not have the wall chilling system 78 (i.e., evaporator coils 80), such as the top wall 58e and bottom wall 58f, will generally also have insulation 82 to prevent heat loss therethrough. The materials for, construction of and configuration of insulated exterior walls 58 to direct and retain cold temperatures to an interior chamber 60 are well known in the art.

Figure 8:
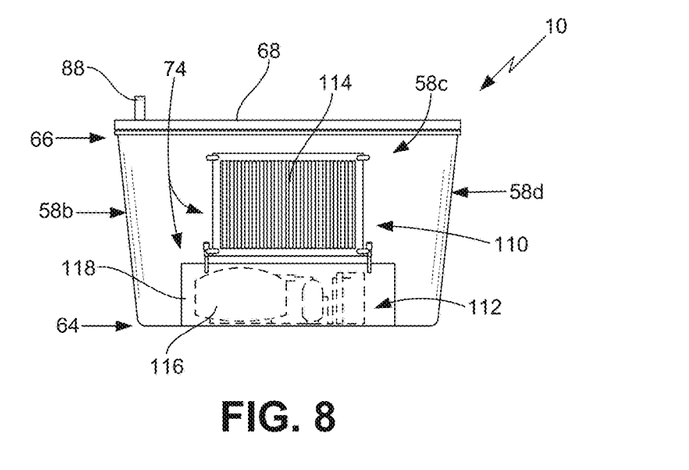
FIG. 8 is a left side view of the insulated chilling reservoir of FIG. 7.

In the preferred embodiments of the chilling reservoir 10 of the present invention, the front wall 58a, back wall 58b and sidewalls 58c/58d of the reservoir body 56 are tapered, with the upper end 66 being wider than the lower end 64, as best shown in FIGS. 7-8. Likewise, in the preferred embodiments, the interior walls 62 of the interior chamber 60 are also tapered in a like manner (i.e., having a wider upper end 66 than lower end 64). Preferably, the exterior walls 58a/58b/58c/58d of the reservoir body 56 are cooperatively sized and configured to fit within the interior chamber 60 of the reservoir body 56 so one chilling reservoir 10 can be stacked inside another similarly configured (size and shape) chilling reservoir 10 for ease and efficiency with regard to storing and shipping of the chilling reservoirs 10. In a preferred configuration, the exterior walls 58a/58b/58c/58d of one chilling reservoir 10 will tightly and securely engage the interior walls 62 of another chilling reservoir 10 to prevent unwanted wear and tear of either chilling reservoir 10.

Figure 9:
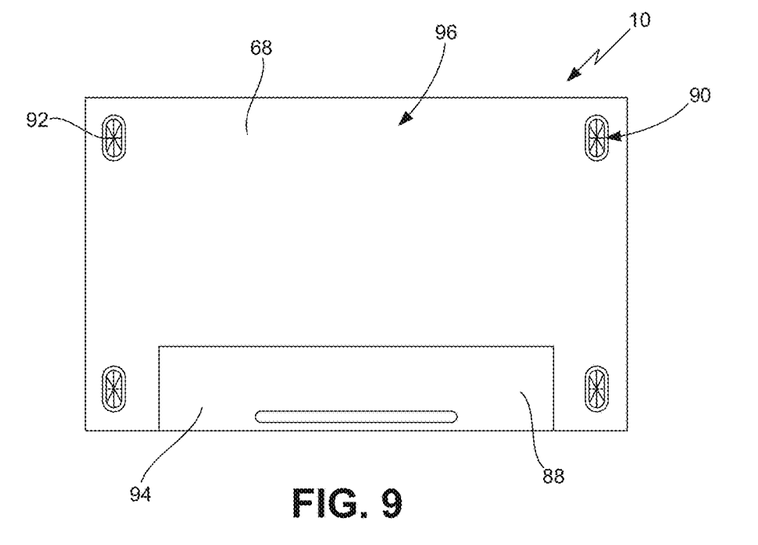
FIG. 9 is a top view of the insulated chilling reservoir showing an alternative configuration for the lid.

In one embodiment of the chilling reservoir 10 of the present invention, the chilling reservoir 10 is provided and utilized without the reservoir lid 68, such that the reservoir body 56 is open at the upper end 66 into the interior chamber 60. In a preferred configuration, however, the chilling reservoir 10 will be utilized with the reservoir lid 58, such as shown in FIGS. 2 and 7-10. To help maintain the nutrient solution 14 at the grower's desired lower temperature, and thus requiring less energy (i.e., electricity cost) to lower the temperature of the nutrient solution 14, it is generally preferred that reservoir lid 58 have the insulation 82 described above with regard to the exterior walls 58. The reservoir lid 68 can be hingedly connected to one of the exterior walls 58a/58b/58c/58d of the reservoir body 56 or, as shown in the figures, removably positioned on the top wall 58e. To help the grower properly position (i.e., to close and substantially seal off the open interior chamber 60) the reservoir lid 68 on the reservoir body 56, the chilling reservoir 10 can utilize a lid engaging mechanism 84, such as one or more pins 86 on the top wall 58e of the reservoir body 56, as shown in FIGS. 3-6 and 10, that are sized and configured to fit into cooperatively sized and configured apertures (not shown) on the bottom surface of reservoir lid 68. The configuration and use of this type of lid engaging mechanism 84 is generally well known in the relevant art. In a preferred configuration, the reservoir lid 68 also has a handle 88, as shown in FIGS. 2, 7 and 9, that allows the user to more easily remove the reservoir lid 68 from the reservoir body 56 and to place the reservoir lid 68, particularly in a manner that engages the lid engaging mechanism 84, back on the top wall 58e of the reservoir body 56.

As set forth in the Background, many people utilize various other equipment with the reservoir 32 of the prior art hydroponic system 18 to transfer the nutrient solution 14 to the plant tray 22, to improve the quality of the nutrient solution 14 for the plants 16 and/or to monitor the nutrient solution 14. Often, the use of such equipment requires that at least a portion of the equipment be placed inside the interior chamber 60 and connect to a source of electrical power 54 or to another piece of equipment, monitor or other device. To facilitate use of such additional equipment while being able to have the reservoir lid 68 in place on top of the top wall 58e, the preferred reservoir lid 68 has one or more lid apertures 90, as shown in FIGS. 2 and 9, that extend entirely through the reservoir lid 68 so as to allow communication with the interior chamber 60 positioned below the reservoir lid 68. To reduce the likelihood of heat entry into the interior chamber 60 from the growing area 36, which could raise the temperature of the nutrient solution 14 or require more energy to keep the nutrient solution 14 in the desired temperature range, each of the lid apertures 90 has a grommet-type device 92, also shown in FIGS. 2 and 9, that is, preferably, structured and arranged to substantially seal around any wire, cable, tube, hose or other item that is passing through the lid aperture 90 into or out of the interior chamber 60. If desired, the reservoir lid 68 can also be provided with a lid door, shown as 94 in FIG. 9, that in one embodiment is pivotally attached at the upper surface 96 of reservoir lid 68. In another embodiment, the lid door 94 can be removably positioned or attached to the reservoir lid 68. The lid door 94 allows the grower to have easier access to the interior chamber 60 to add water or nutrient materials to the nutrient solution 14 (or otherwise adjust the content of the nutrient solution 14), monitor the quality, level or other status of the nutrient solution 14 and/or to place equipment in or remove equipment, such as pumps, aerating equipment, dosers and the like, from the interior chamber 60.

In one embodiment, the bottom wall 58f or the bottom of the side exterior walls (58a/58b/58c/58d) is or are configured to rest on a floor or other surface. As set forth above, however, in the preferred embodiments the chilling reservoir 10 has wheels 70 attached to the bottom wall 58f or the bottom of the side exterior walls (58a/58b/58c/58d) that allow the user to more easily move the chilling reservoir 10 across the surface, typically to, from or in the growing area 36. In the embodiment of FIGS. 2-5, the wheels 70 are casters or caster-like wheels that are secured to the reservoir body 56. The configuration and use of such wheels that may be suitable for use as the wheels 70 of the present invention are well known to persons skilled in the relevant art. In the configuration of the chilling reservoir 10 shown in FIG. 6, the wheels 70 are part of a wheel assembly 98. The wheels 70 of the wheel assembly 98 are fixedly or removably attached to a platform member 100 that, in one embodiment, is either fixedly attached to or removably attached to the bottom wall 58f or the bottom of the side exterior walls (58a/58b/58c/58d) of the reservoir body 46. In another embodiment, the reservoir body 56 and the platform member 100 of the wheel assembly 98 are cooperatively sized and configured such that the reservoir body 56 merely sits on the upper surface of the platform member 100 (i.e., not attached or connected). If desired, the bottom wall 58f and the upper surface of the platform member 100 can be cooperatively shaped such that a portion of one of the two components is received in, locks with or otherwise engages the other to help secure, even if temporarily, the wheel assembly 98 to the reservoir body 56.

Figure 6:
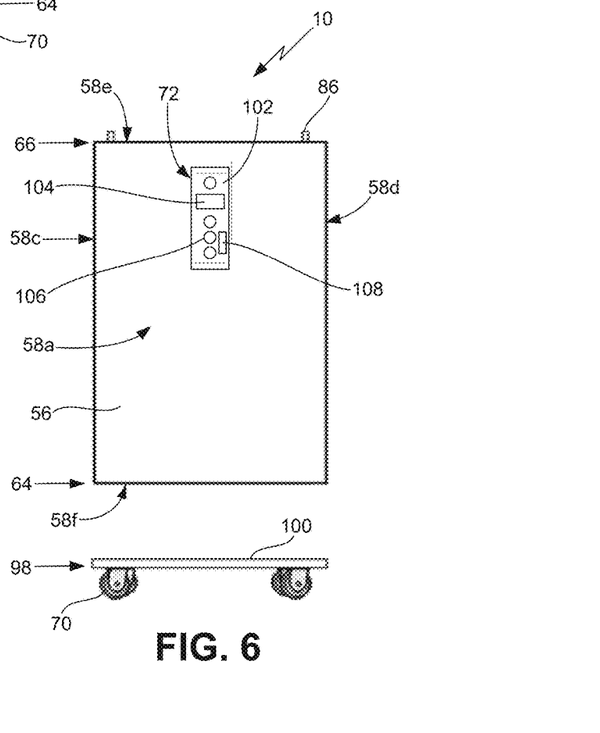
FIG. 6 is a front view of an alternative configuration of the embodiment of the insulated chilling reservoir of FIG. 3 shown with a removable wheel assembly.

As described above, in the preferred embodiments of the present invention, the chilling reservoir has a control device 72 that is in operative or functional communication with the interior chamber 60 (although it may not be necessary to actually be inside the interior chamber 60). In the embodiment shown in FIGS. 2-6 and the embodiment of FIGS. 7-10, the control device 72 is fixedly positioned on the front wall 58a of reservoir body 56. As will be readily appreciated by persons skilled in the art, however, the control device 72 may be positioned on any of the exterior walls 58, though most likely will be on one of the side exterior walls (58a/58b/58c/58d) or on the reservoir lid 68. In a typical configuration, the control device 72 will comprise a control body 102 that operatively supports a display screen 104 and one or more (typically a plurality) of buttons 106. In the embodiments shown in the figures, the control device 72 also has a USB port 108, as best shown in FIGS. 2, 3 and 6. The display screen 104 can be utilized to display the temperature of the internal chamber 60, the liquid nutrient solution 14 in the internal chamber 60, the time, date and/or any other information that is or may be pertinent to the grower. The buttons 106 can include an on/off button, one or more temperature adjust buttons (i.e., up and down buttons), a button that changes the display and/or buttons that set the desired temperature range for the nutrient solution 14. If the chilling reservoir is properly configured, the control device 72 can also be utilized to display measurements with regard to pH, TDC and oxygen levels for the nutrient solution 14.

One of the primary components of the chilling reservoir 10 of the present invention is the chilling mechanism 74, which comprises the wall chilling system 78 (i.e., the evaporator coils 80) described above, a condenser system 110 and the refrigerant system 112, which are best shown in FIGS. 3, 5, 7 and 8. As will be readily familiar to those skilled in the art, a typical condenser system 110 has a radiator 114, with a plurality of radiator fins or like devices, that allow heat to be discharged from the chilling mechanism 74 and the refrigerant system 112 has a compressor 116 that increases the pressure of a gas refrigerant (converting the refrigerant gas to a liquid) and then flows the refrigerant through the condenser 110 and, typically, an expansion device (not separately shown) and into the wall chilling system 78 (i.e., the evaporator coils 80) to cool the interior chamber 60 so as to lower or maintain the low temperature of the nutrient solution 14 in the interior chamber 60. As also well known to persons skilled in the relevant art, the typical refrigerant system 112 also includes a storage tank for storing refrigerant, a pump to pump the refrigerant through the chilling mechanism 74 and other components. In one embodiment of the chilling reservoir, the refrigerant system 112 can be positioned in a cavity in one of the side exterior walls (58a/58b/58c/58d) or in a cavity below the bottom wall 58f of the reservoir body 46 that is open to allow a person to replace refrigerant and/or to repair or replace equipment as may be needed or desired. In the embodiment shown in the figures, the refrigerant system 112 is positioned behind a system door 118 that is, typically, either pivotally or removably attached to the reservoir body 56 to allow access to the components of the refrigerant system 112.

The interior chamber 60 of the chilling reservoir 10 is defined by the interior walls 62 and a chamber floor 120. As set forth above, the interior chamber 60 can be configured in a wide variety of different sizes and shapes to, at least generally, accommodate the grower's anticipated hydroponic system 12. In the embodiment of FIGS. 2-5, the interior walls 62 taper down to a generally planar chamber floor 120, as best shown in FIG. 4. In the embodiment of FIGS. 7-10, the interior walls 62 taper down to one or more platforms 122 that are spaced above the chamber floor 120 to form a sump area 124 above which the circulating pump may be placed (i.e., on one of the platforms 122). Any other equipment that is utilized in the interior chamber 60, as described above, may be placed on one of the platforms 122 or in the sump area 124, as may be beneficial for using that equipment to improve the quality of the nutrient solution 14 and the delivery of the nutrient solution 14 to the plants 16.

Figure 11:
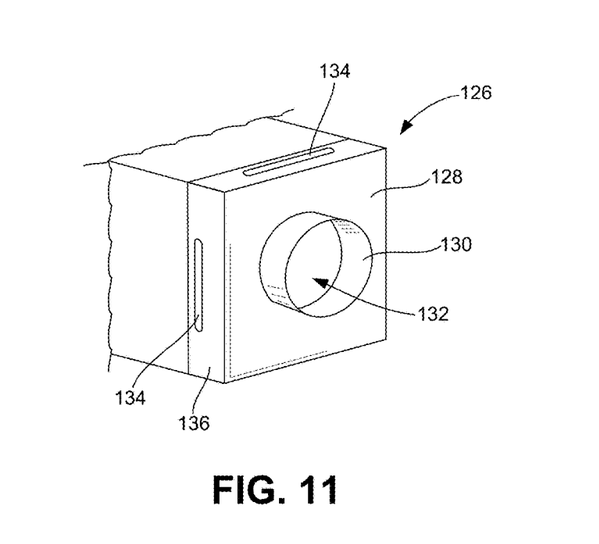
FIG. 11 is a side perspective view of a vent shroud configured for use with the chilling reservoir of the present invention.
Figure 12:
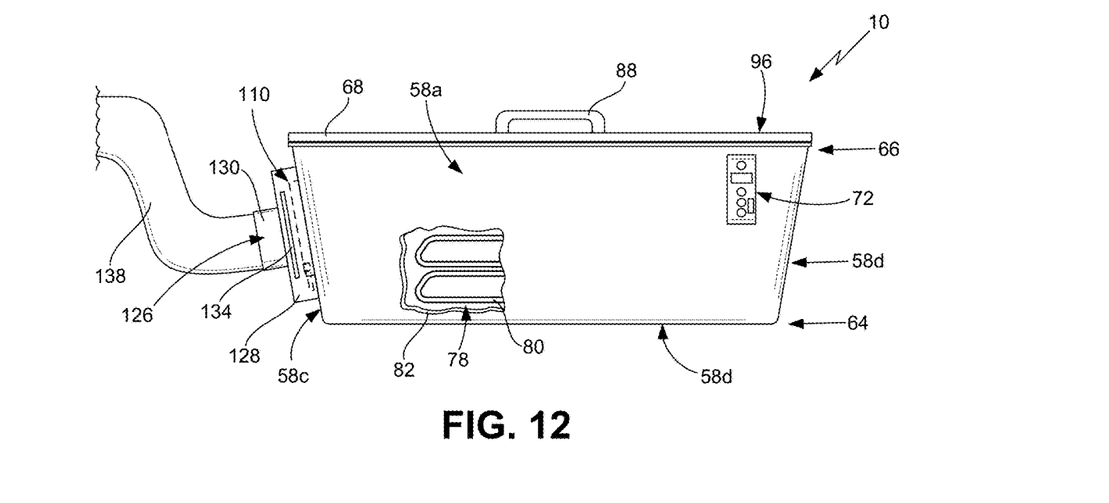
FIG. 12 is a front view of the chilling reservoir of FIG. 7 shown in use with the vent shroud of FIG. 11.

As with current chillers 44, the radiator 114 of the condenser system 110 will discharge heat into the area where the chilling reservoir 10 is located. In a typical configuration, the chilling reservoir 10 will be in the growing area 36. As set forth above, the lights and other equipment in the growing area 36 that are needed or beneficial to grow the plants 16 already generate, generally, too much heat in the growing area 36. Additional heat from the chilling reservoir 10 only adds to this problem. To remove the heat generated from use of the chilling reservoir 10, the grower can attach a vent shroud 126, shown in FIGS. 11 and 12, to the reservoir body 56 over the radiator 114 of the condenser system 110, as shown in FIG. 12. The vent shroud 126 can have a housing 128 that is sized and configured to fit over the radiator 114 to trap the heat escaping from the condenser system 110. The housing 128 of the vent shroud 126 has at least one discharge vent 130, with a vent opening 132, and one or more plurality of intake openings 134 that allows air to be drawn into the area of the radiator 114 to pull the heat away from the chilling reservoir 10. In the embodiment shown in FIG. 11, the intake openings 134 are slots that are in one or more of the sidewalls 136 of the shroud housing 128. A vent hose 138, shown in FIG. 12, will connect to the discharge vent 130 to draw the heated air away from the condenser system 110 (and the chilling reservoir 10) to discharge the heated air to the outside or another area that is, preferably, not near the chilling reservoir 10 and the growing area 36. The vent shroud 126 can be made out of a wide variety of materials, including sheet metal, aluminum, plastic, composites and the like, and in a wide variety of different sizes and shapes that may be suitable or beneficial for use to draw heat away from the condenser system 110 and, as such, the chilling reservoir 10 itself.

The new hydroponic system 12 of the present invention includes use of the chilling reservoir 10 described above. In one configuration, the new chilling reservoir 10 is utilized in place of the prior art reservoir 32 shown in FIG. 1 (without, of course, the separate chiller 44 and the pipes 46/48 connecting the chiller 44 to the reservoir 32) to deliver lower temperature (i.e., chilled) nutrient solution 14 to the plant tray 22 to benefit the plants 16 growing in the baskets 28 disposed in the plant openings 26 of the tray lid 24. The nutrient solution 14 is cooled and kept cool in the chilling reservoir 10 and the chilled nutrient solution 14 from the chilling reservoir 10 is circulated through the plant tray 22 by the circulating pump 42.

Figure 10:
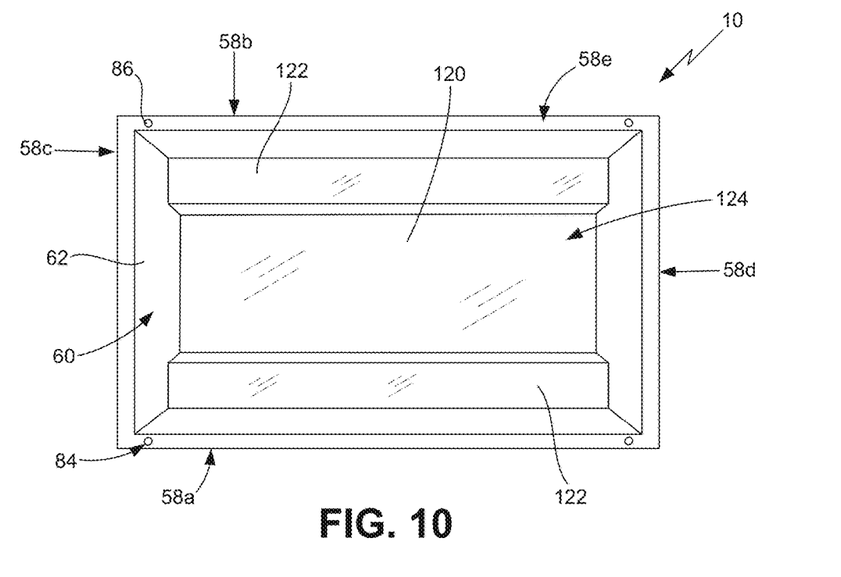
FIG. 10 is a top view of the insulated chilling reservoir of FIG. 9 shown with the lid to illustrate the use of a pair of platforms inside the reservoir chamber.
Figure 13:
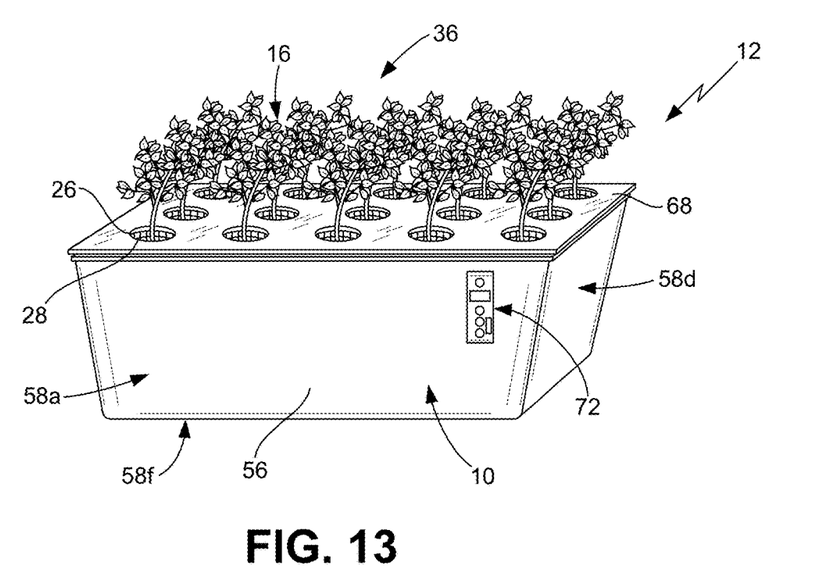
FIG. 13 is a front perspective view of a chilling reservoir that is configured according to a third embodiment of the present invention shown in use with a reservoir lid being utilized as a plant tray having openings through which the plants grow.

In another embodiment of the new hydroponic system 12 of the present invention, the new chilling reservoir 10 is utilized with a "deep water culture" configuration with (as shown in FIG. 13) the chilling reservoir 10 as the plant tray 22 and the reservoir lid 68 as the tray lid 24 (of the prior art system 18 of FIG. 1). The components of the chilling reservoir 10 described with regard to FIGS. 7-10 are modified to be utilized for this type of hydroponic system 12. More specifically, in this embodiment, the reservoir lid 68 is provided with one or more plant openings 26 that are sized and configured to support a basket 28 in which one or more plants 16 will grow. The roots of the plants 16 will extend downward into the liquid nutrient solution 14 in the interior chamber 60 in the reservoir body 56 (as shown in FIG. 10—though the platforms 122 may not be necessary). The grower utilizes the control device 72 to monitor and control the temperature, as well as any other attributes that are controlled/monitored by the control device 72, to ensure that the nutrient solution 14 is in the temperature range he or she desires. One or more alarms, such as audio or light signals, can be integrated into or connected to the control device 72 to let the grower know when something is amiss with the nutrient solution.

Figure 14:
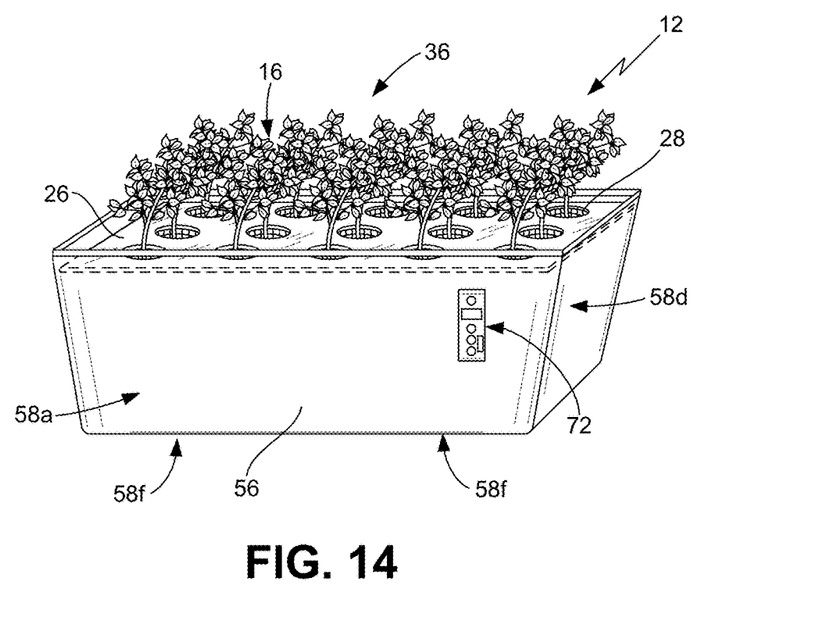
FIG. 14 is a front perspective view of a chilling reservoir that is configured according to a fourth embodiment of the present invention shown in use with a floating plat tray disposed inside the interior chamber and floating on the liquid nutrient solution therein.
Figure 15:
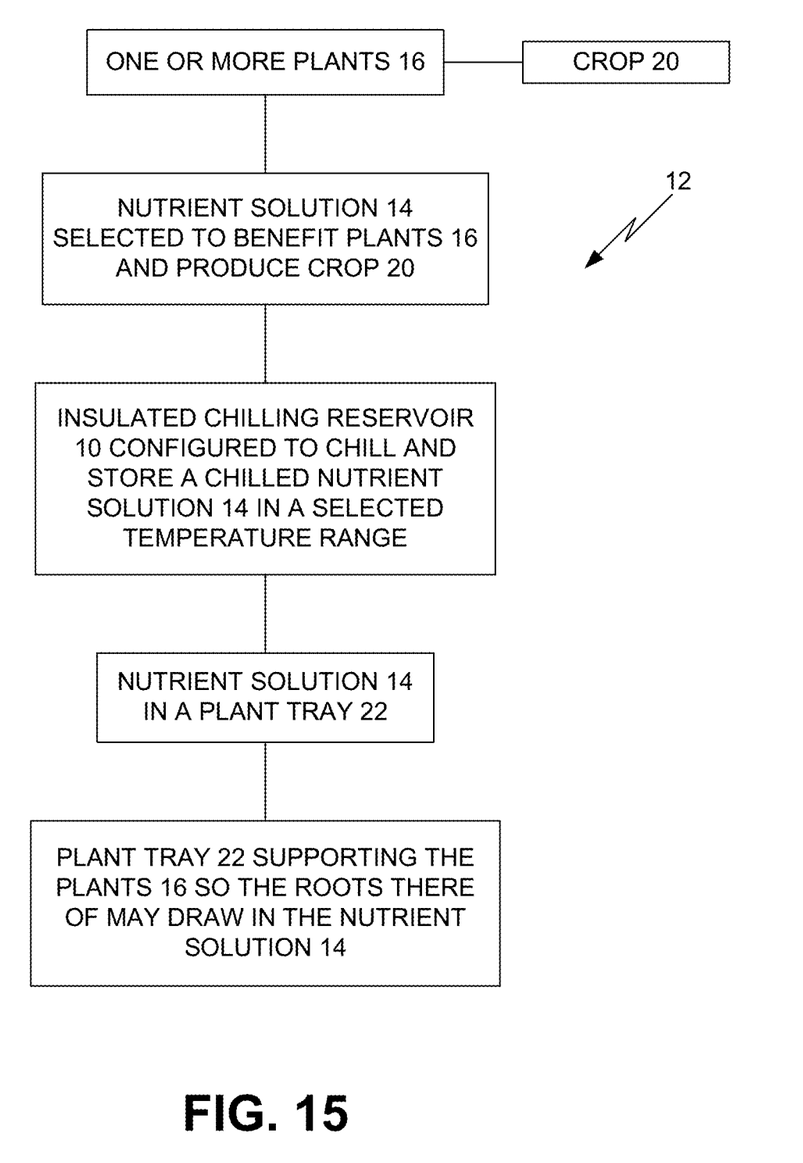
FIG. 15 is a chart of showing one configuration of a hydroponic system configured according to a preferred embodiment of the present invention.

In yet another embodiment of the new hydroponic system 12 of the present invention, the new chilling reservoir 10 is utilized with a "floating tray" type of configuration, an example of which is shown in FIG. 14. For this configuration, the chilling reservoir 12 (which also serves as plant tray 22) is open at the upper end 66 and a floating tray lid 140 is structured and arranged to float on top of the liquid nutrient solution 14 in the interior chamber 60 of the reservoir body 56. The floating plant tray 140, which is typically made out of Styrofoam or other lightweight materials, has a plurality of plant openings 26 that each support a basket 28 such that the roots of the plants 16 in the baskets 28 will extend into the liquid nutrient solution 14. As described above, the new chilling reservoir 10 will keep the temperature of the nutrient solution 14 in the range that is desired by the grower for the benefit of the plants 16 and the production of crop from the plants 16.

In use, the new chilling reservoir 10 is connected to a source of electrical power 54, using the power cord 76, and the grower will place the nutrient materials and water into the interior chamber 60 of the reservoir body 56. The nutrients and water are mixed as done in prior art hydroponic systems 18 and any other equipment, such as aerators, pumps, dosers and the like, are placed inside the interior chamber 60. In the embodiment where the chilling reservoir 10 is separate from the plant tray 22, the power cords and any required tubes, pipes, hoses or other items are passed through one or more of the grommets 92 in the lid apertures 90 of the reservoir lid 68 and connected, as required for proper operation of the hydroponic system 12, the plant tray 22 and/or the source of electrical power 54. Once the grower sets the desired temperature range for the nutrient solution 14, the chilling reservoir 10 will operate to keep that nutrient solution 14 in that temperature range. The insulated reservoir body 56 will reduce the cost of cooling the nutrient solution 14 by reducing heat loss through the exterior walls 58 thereof. The grower can monitor and control the operation of the chilling reservoir 10 by utilizing the control device 72 that, in one embodiment, is attached to one of the side exterior walls ($58a/58b/58c/58d$).

It is anticipated that the chilling reservoir 10 of the present invention for growing plants 16 will facilitate the growth of stronger, healthier and more productive plants 16 that will result in an increase of the quality and quantity of the desired crop. The grower will be able to adjust the nutrient solution 14 and control the temperature thereof in a manner that provides a more optimum growing environment for the plants 16 without the cost and space requirement of using a separate chiller 44 and the costs and hassles associated with the required piping and other connections for a separate chiller 44. The new chilling reservoir 10 can be modified to accommodate the requirements of any particular type of hydroponic system 12 and for a wide variety of different types of plants 16. In addition, the chilling reservoir 10 can be sized and configured in a smaller size for a single plant 16 or it can be increased in size and, if desired, be provided with a different configuration for a large number of plants 16. In any configuration, the new chilling reservoir 10 will provide the grower with better control over the nutrient solution 14 and enable him or her to improve the growth of the plants 16 and production of crop therefrom. The chilling reservoir 10 can be utilized for asexual propagation (cloning) of plants 16. If desired, a mister or like devices can utilize the chilled nutrient solution 14 in the interior chamber 60 as the source of the fluid for the device. As such, the new chilling reservoir 10 of the present invention accomplishes the objectives set forth above.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A chilling reservoir to lower and maintain the temperature of a nutrient solution utilized to grow one or more plants, said chilling apparatus comprising:
a reservoir body having a plurality of exterior walls defining a lower end and an upper end, said plurality of exterior walls comprising one or more side exterior walls, each of said side exterior walls being insulated;
an interior chamber in said reservoir body, said interior chamber enclosed by said exterior walls of said reservoir body, said interior chamber being defined by one or more interior walls and a chamber floor, said interior chamber sized and configured to receive and hold the nutrient solution therein with the nutrient solution being disposed against said interior walls of said interior chamber; and
chilling means associated with said reservoir body and said interior chamber for lowering the temperature of the nutrient solution when the nutrient solution is in said interior chamber, said chilling means comprising a wall chilling system, a condenser system and a refrigerant system that are cooperatively structured and arranged to lower the temperature of the nutrient solution through said interior walls of said interior chamber.

2. The chilling reservoir of claim 1, wherein said wall chilling system comprises one or more evaporator coils disposed in at least one of said side exterior walls.

3. The chilling reservoir of claim 2, wherein said one or more evaporator coils are disposed in each of said side exterior walls.

4. The chilling reservoir of claim 1 further comprising a reservoir lid, said reservoir lid sized and configured to be received at said upper end of said reservoir body and close said interior chamber.

5. The chilling reservoir of claim 4, wherein said reservoir lid has one or more openings therein.

6. The chilling reservoir of claim 5, wherein each of said openings have a grommet disposed therein to sealably close said openings.

7. The chilling reservoir of claim 4, wherein said reservoir lid has one or more lid doors.

8. The chilling reservoir of claim 7, wherein said control device comprises at least one of a display screen, one or more buttons and a USB port.

9. The chilling reservoir of claim 1 further comprising one or more wheels at said lower end of said reservoir body.

10. The chilling reservoir of claim 9, wherein said wheels are attached to or integrally formed with a platform member, said platform member structured and arranged to receive said lower end of said reservoir body and to moveably support said reservoir body.

11. The chilling reservoir of claim 1 further comprising a control device attached to one of said plurality of exterior walls of said reservoir body, said control device being configured to control the temperature of the nutrient solution when the nutrient solution is in said interior chamber.

12. The chilling reservoir of claim 1, wherein said condenser system comprises a radiator.

13. The chilling reservoir of claim 12 further comprising a vent shroud having a shroud housing, one or more intake openings in said shroud housing and a discharge vent integral with or attached to said shroud housing, said shroud housing sized and configured to enclose said radiator, said discharge vent sized and configured to attach to a vent hose.

14. The chilling reservoir of claim 1 further comprising a reservoir lid, said reservoir lid sized and configured to be received at said upper end of said reservoir body, said reservoir lid having one or more plant openings therein, each of said plant openings having at least one of the plants therein.

15. The chilling reservoir of claim 1, wherein said interior chamber is sized and configured to receive a floating plant tray that is configured to float on the nutrient system in said interior chamber.

16. A chilling reservoir to lower and maintain the temperature of a nutrient solution utilized to grow one or more plants, said chilling apparatus comprising:
a reservoir body having a plurality of exterior walls defining a lower end and an upper end, said plurality of exterior walls comprising one or more side exterior walls, each of said side exterior walls being insulated;
an interior chamber in said reservoir body, said interior chamber enclosed by said exterior walls of said reservoir body, said interior chamber being defined by one or more interior walls and a chamber floor, said interior chamber sized and configured to receive and hold the nutrient solution therein with the nutrient solution being disposed against said interior walls of said interior chamber;
chilling means associated with said reservoir body and said interior chamber for lowering the temperature of the nutrient solution when the nutrient solution is in said interior chamber, said chilling means comprising a wall chilling system, a condenser system and a refrigerant system that are cooperatively structured and arranged to lower the temperature of the nutrient solution through said interior walls of said interior chamber, said wall chilling system having one or more evaporator coils disposed in each of said side exterior walls, said condenser system having a radiator; and
a control device attached to one of said plurality of exterior walls of said reservoir body, said control device being configured to control the temperature of the nutrient solution when the nutrient solution is in said interior chamber.

17. The chilling reservoir of claim 16 further comprising a reservoir lid, said reservoir lid sized and configured to be received at said upper end of said reservoir body and close said interior chamber.

18. The chilling reservoir of claim 16 further comprising one or more wheels at said lower end of said reservoir body.

19. A hydroponic system, comprising:
one or more plants;
a plant tray supporting each of said one or more plants;
a liquid nutrient solution;
a chilling reservoir having a reservoir body, an interior chamber in said reservoir body and chilling means associated with said reservoir body and said interior chamber for lowering the temperature of the nutrient solution when the nutrient solution is in said interior chamber, said reservoir body having a plurality of exterior walls defining a lower end and an upper end, said exterior walls comprising one or more side exterior walls, each of said side exterior walls being insulated, said interior chamber enclosed by said exterior walls of said reservoir body, said interior chamber being defined by one or more interior walls and a chamber floor, said interior chamber sized and configured to receive and hold the nutrient solution therein with the nutrient solution being disposed against said interior walls of said interior chamber, said chilling means having a wall chilling system, a condenser system and a refrigerant system that are cooperatively structured and arranged to lower the temperature of the nutrient solution through said interior walls of said interior chamber.

20. The hydroponic system of claim 19 further comprising a control device attached to one of said plurality of exterior walls of said reservoir body, said control device being configured to control the temperature of the nutrient solution when the nutrient solution is in said interior chamber.

* * * * *